(12) United States Patent
Nagatani (10) Patent No.: US 11,718,226 B2
(45) Date of Patent: *Aug. 8, 2023

(54) VEHICLE CONTROL SYSTEM

(71) Applicant: TOYOTA JIDOSHA KABUSHIKI KAISHA, Aichi-ken (JP)

(72) Inventor: Takaaki Nagatani, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,593

(22) Filed: Feb. 15, 2022

(65) Prior Publication Data

US 2022/0314878 A1    Oct. 6, 2022

(30) Foreign Application Priority Data

Mar. 31, 2021 (JP) ................... 2021-060595

(51) Int. Cl.
*B60Q 9/00* (2006.01)
*G08B 7/06* (2006.01)

(52) U.S. Cl.
CPC . *B60Q 9/00* (2013.01); *G08B 7/06* (2013.01)

(58) Field of Classification Search
CPC ..................................... B60Q 9/00; G08B 7/06
See application file for complete search history.

(56) References Cited

U.S. PATENT DOCUMENTS

| 2008/0278301 | A1 | 11/2008 | Kaneiwa | |
| 2013/0030657 | A1* | 1/2013 | Chatterjee | B60W 30/00 701/46 |
| 2016/0001781 | A1* | 1/2016 | Fung | G16H 50/20 701/36 |
| 2020/0023840 | A1* | 1/2020 | Taylor | G06V 20/58 |
| 2020/0148231 | A1* | 5/2020 | Hassani | A61B 5/4839 |
| 2022/0306137 | A1 | 9/2022 | Manabe et al. | |

FOREIGN PATENT DOCUMENTS

| JP | 2005234773 A | 9/2005 |
| JP | 2008107974 A | 5/2008 |

* cited by examiner

*Primary Examiner* — Omer S Khan
(74) *Attorney, Agent, or Firm* — Hauptman Ham, LLP (57) ABSTRACT

In a vehicle control system, a risk frequency calculation unit counts the number of times that a risk level determination unit determines that a risk level is equal to or higher than a predetermined risk level within a predetermined period. Then, a warning frequency setting unit sets a frequency of warning in accordance with the number of times, counted by the risk frequency calculation unit, that the risk level of the driving operation by the driver is determined to be equal to or higher than the predetermined risk level within the predetermined period and activates a warning device.

4 Claims, 7 Drawing Sheets

VEHICLE CONTROL SYSTEM

CROSS-REFERENCE TO RELATED APPLICATION

This application claims priority to Japanese Patent Application No. 2021-060595 filed on Mar. 31, 2021, incorporated herein by reference in its entirety.

BACKGROUND

1. Technical Field

The present disclosure relates to a vehicle control system.

2. Description of Related Art

Japanese Unexamined Patent Application Publication No. 2005-234773 (JP 2005-234773 A) discloses a technique related to a driver state estimation device. The driver state estimation device above estimates a dependence of a driver on a warning device. When the dependence is high, the driver himself or herself issues warning to call attention.

SUMMARY

However, in the above prior art, although a driving operation by the driver who is highly dependent on the warning device is evaluated, the driving operation by the driver whose dependence on the warning device is too low, that is, the driver who tends to ignore the warning by the warning device, is not evaluated. That is, in the above-mentioned prior art, no countermeasure is taken for the driver who tends to ignore the warning. Therefore, there is room for improvement in that the driver is suppressed from engaging in risky driving.

In consideration of the above fact, an object of the present disclosure is to obtain a vehicle control system capable of suppressing a driver from engaging in the risky driving.

A vehicle control system according to the present disclosure includes: an operation unit that is able to output an operation signal based on a driving operation of a vehicle by a driver; a model storage unit that stores a standard driving model of the vehicle; a risk level determination unit to which the operation signal is inputtable, and that compares the driving operation with the standard driving model and determines a risk level of the driving operation; and a notification unit that issues warning to the driver when the risk level is determined to be equal to or higher than a predetermined risk level; a risk frequency calculation unit that counts the number of times that the risk level is determined to be equal to or higher than a predetermined risk level within a predetermined period; and a warning frequency setting unit that sets a frequency of the warning in accordance with the number of times and is able to activate the notification unit.

According to the present disclosure, when the driver performs the driving operation on the operation unit, the operation signal based on the driving operation of the vehicle by the driver is output from the operation unit. The operation signal is input to the risk level determination unit. The risk level determination unit compares the driving operation by the driver with the standard driving model of the vehicle stored in the model storage unit such that the risk level of the driving operation is determined. Then, when the risk level determination unit determines that the risk level of the driving operation by the driver is equal to or higher than the predetermined risk level, the notification unit issues the warning to the driver.

When the driver tends to repeat risky driving, it is preferable that the driver be made aware that the driver is engaging in the risky driving.

Here, in the present disclosure, the risk frequency calculation unit counts the number of times that the risk level determination unit determines that the risk level is equal to or higher than the predetermined risk level within a predetermined period. Then, the warning frequency setting unit sets the frequency of warning in accordance with the number of times, counted by the risk frequency calculation unit, that the risk level of the driving operation by the driver is determined to be equal to or higher than the predetermined risk level within the predetermined period, and activates the notification unit.

Therefore, according to the present disclosure, when the driver tends to repeat risky driving, the number of warning to the driver is increased such that the driver can be made aware that the driver is engaging in the risky driving.

In the vehicle control system according to the present disclosure, the warning frequency setting unit compares the number of times counted by the risk frequency calculation unit in a first period with the number of times counted by the risk frequency calculation unit in a second period that is a period later than the first period, and increases the frequency when the number of times tends to increase and reduces the frequency when the number of times tends to decrease.

According to the present disclosure, the warning frequency setting unit compares the number of times that the risk level of the driving operation is determined to equal to or higher than the predetermined risk level counted by the risk frequency calculation unit in the first period with the number of times counted in the second period that is a period later than the first period. Then, when the number of times that the risk level of the driving operation is determined to be equal to or higher than the predetermined risk level tends to increase, the warning frequency setting unit increases the frequency of warning, and reduces the frequency of warning when the number of times tends to decrease. Therefore, the driver can understand whether the driving operation by the driver tends to improve or deteriorate from the viewpoint of safety due to a change in the frequency of warning.

The vehicle control system according to the present disclosure further includes a traveling performance limiting unit. The traveling performance limiting unit compares the number of times counted in the first period with the number of times counted in the second period, compares the number of times counted in the second period with the number of times counted in a third period that is a period later than the second period when the number of times counted in the second period exceeds the number of times counted in the first period, and is able to limit a traveling performance of the vehicle when the number of times counted in the third period exceeds the number of times counted in the second period.

According to the present disclosure, the vehicle control system includes the traveling performance limiting unit. The traveling performance limiting unit compares the number of times that the risk level of the driving operation is determined to be equal to or higher than the predetermined risk level between the first period and the second period. Further, when the number of times of risky driving counted in the second period exceeds the number of times of risky driving counted in the first period, the traveling performance limiting unit compares the number of times between the third period that is a period later than the second period and the second period.

Then, when the number of times of risky driving counted in the third period exceeds the number of times counted in the second period, the traveling performance limiting unit limits the traveling performance of the vehicle.

As described above, the vehicle control system according to the present disclosure has a superior effect that the driver can be suppressed from engaging in the risky driving.

The vehicle control system according to the present disclosure has a superior effect that the vehicle control system can encourage the driver to perform a safe driving operation.

The vehicle control system according to the present disclosure has a superior effect that when the driving operation by the driver does not exhibit the tendency of improvement from the viewpoint of safety, it is possible to limit that the driving operation by the driver is directly reflected in traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
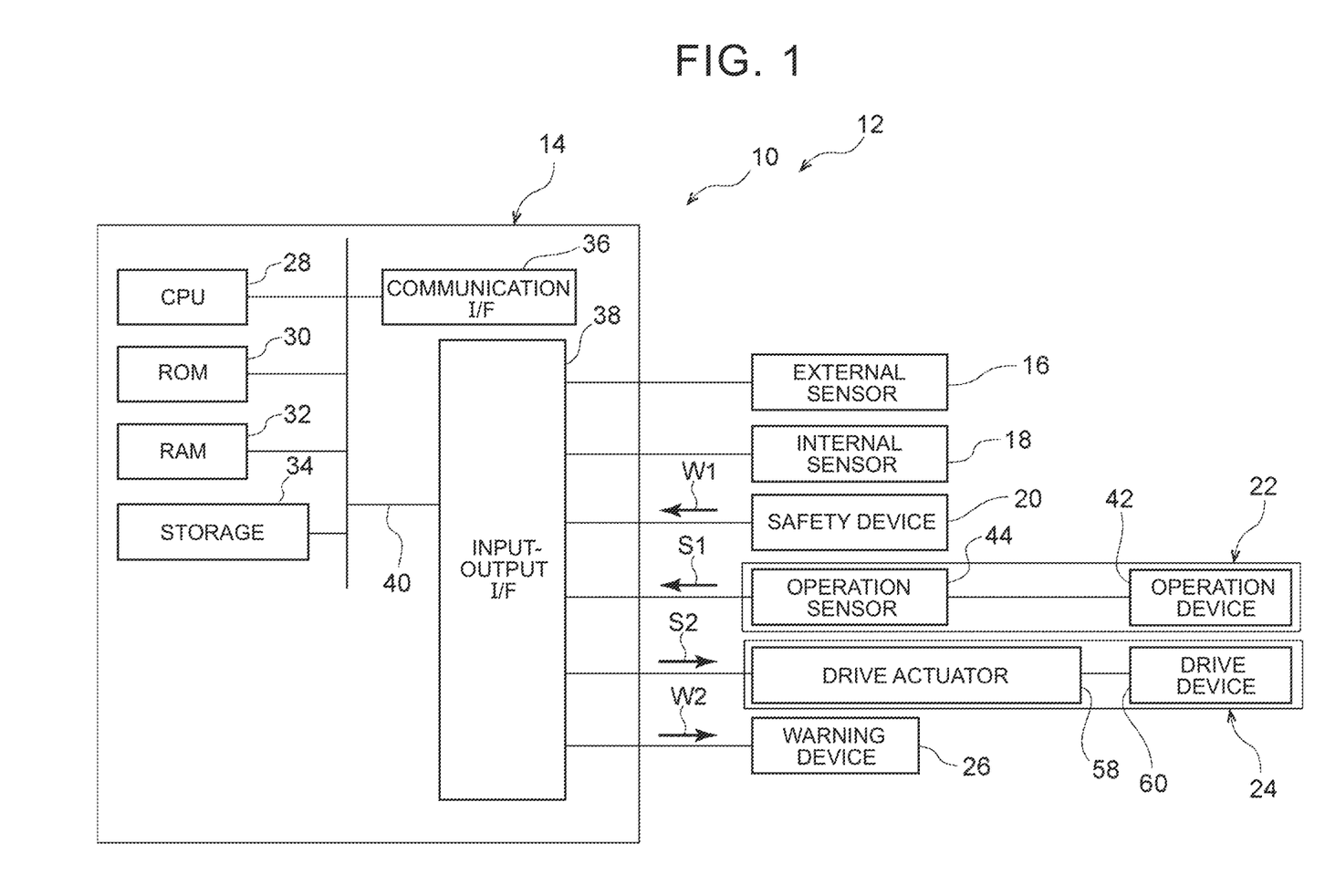
FIG. 1 is a block diagram showing a hardware configuration of a vehicle in a vehicle control system according to the present embodiment.

Hereinafter, an example of an embodiment of a "vehicle control system 10" according to the present disclosure will be described with reference to FIGS. 1 to 7. As shown in FIG. 1, the vehicle control system 10 is configured to include a vehicle control device 14, an external sensor 16, an internal sensor 18, a safety device 20, and an "operation unit 22", a drive unit 24, and a "warning device 26" as a notification unit, each of which is mounted in a "vehicle 12".

First, the configuration of the vehicle control device 14 will be described. The vehicle control device 14 is configured to include a central processing unit (CPU) 28, a read-only memory (ROM) 30, a random access memory (RAM) 32, a storage 34, a communication interface (I/F) 36, and an input-output I/F 38. The CPU 28, the ROM 30, the RAM 32, the storage 34, the communication I/F 36, and the input-output I/F 38 are connected to each other via a bus 40 so as to be able to communicate with each other.

The CPU 28 is a central arithmetic processing unit, and is capable of controlling various devices by executing various programs. Specifically, the CPU 28 is capable of reading the program from the ROM 30 and execute the program using the RAM 32 as a work area. Then, the vehicle control device 14 can exert various functions that will be described later as the execution program stored in the ROM 30 is read out and executed by the CPU 28.

More specifically, the ROM 30 stores various programs and various types of data related to control of the drive unit 24 and the like. Further, the RAM 32 can temporarily store the program or data as a work area.

The storage 34 is configured to include a hard disk drive (HDD) or a solid state drive (SSD), and is capable of storing various programs including an operating system and various types of data such as a standard driving model and the number of times of risky driving that will be described later, and the like.

The communication I/F 36 is an interface used for connecting the vehicle control device 14 to various networks, and is capable of communicating with a server (not shown) or the like. For the interface above, for example, communication standards such as Ethernet (registered trademark), fiber-distributed data interface (FDDI), and Wi-Fi (registered trademark) are used. Further, the communication I/F 36 may include a wireless device.

The input-output I/F 38 is an interface for the vehicle control device 14 to communicate with various devices mounted on the vehicle 12. Then, the vehicle control device 14 is connected to each of the external sensor 16, the internal sensor 18, the safety device 20, the operation unit 22, the drive unit 24, and the warning device 26 via the input-output I/F 38 so as to be communicable with each other.

The external sensor 16 is a group of sensors used for detecting the surrounding environment of the vehicle 12. The external sensor 16 includes, for example, a camera that captures images within a predetermined range, a millimeter-wave radar that transmits an exploration wave to a predetermined range, a laser imaging detection and ranging (LiDAR) that scans a predetermined range, and the like. Then, the data acquired by the external sensor 16 is transmitted to the vehicle control device 14 and temporarily stored in the storage 34.

The internal sensor 18 is a group of sensors used for detecting the traveling state of the vehicle 12, and includes at least one of a vehicle speed sensor, an acceleration sensor, and a yaw rate sensor. Then, the data acquired by the internal sensor 18 is stored in the storage 34.

The safety device 20 is a group of devices for ensuring the safety performance of the vehicle 12, and includes at least one of an antilock brake system (ABS) device, a vehicle stability control (VSC) device, a traction control system (TRC) device, and a pre-crash safety (PCS) device. When the safety device 20 is activated, a predetermined activation signal W1 is output to the vehicle control device 14 such that the activation history of the safety device 20 is stored in the storage 34.

Figure 3:
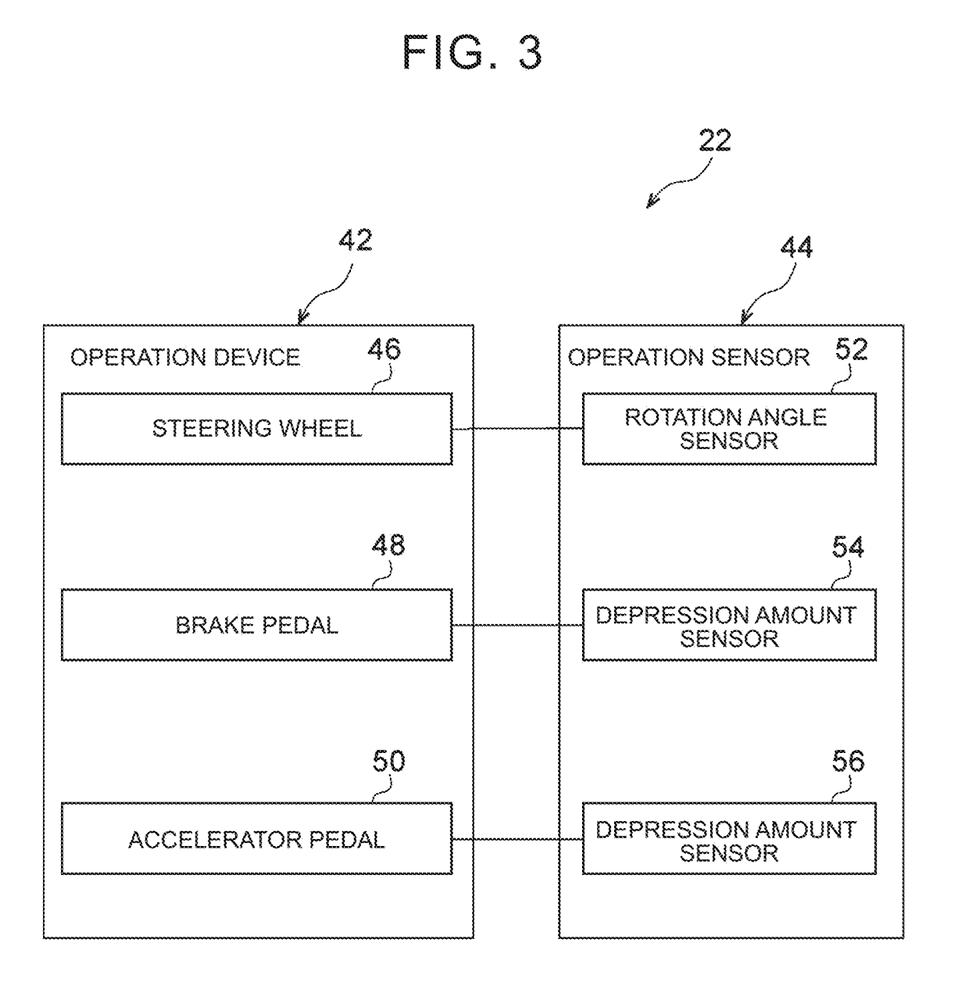
FIG. 3 is a block diagram showing a configuration of an operation unit in the vehicle control system according to the present embodiment.

As shown in FIG. 3, the operation unit 22 includes an operation device 42 and an operation sensor 44. The operation device 42 includes a steering wheel 46, a brake pedal 48, and an accelerator pedal 50 operated by a driver (not shown). Then, according to the present embodiment, the driving operation of the operation device 42 by the driver is detected by the operation sensor 44, and an operation signal S1 based on the driving operation is output from the operation sensor 44 to the vehicle control device 14.

Specifically, the operation sensor 44 includes a rotation angle sensor 52, a depression amount sensor 54, and a depression amount sensor 56. The rotation angle sensor 52 is disposed in the vicinity of a rotation shaft (not shown) of the steering wheel 46, and is capable of detecting the angle and the angular velocity when the steering wheel 46 rotates.

The depression amount sensor 54 is disposed in the vicinity of a rotation shaft (not shown) of the brake pedal 48, and is capable of detecting the depression amount of the brake pedal 48. Specifically, the depression amount sensor 54 is capable of detecting the angle and the angular velocity when the brake pedal 48 pivots about the rotation shaft.

The depression amount sensor 56 is disposed in the vicinity of a rotation shaft (not shown) of the accelerator pedal 50, and is capable of detecting the depression amount of the accelerator pedal 50. Specifically, the depression amount sensor 56 is capable of detecting the angle and the angular velocity when the accelerator pedal 50 pivots about the rotation shaft. Then, the vehicle control device 14 is capable of controlling the drive unit 24 by outputting a drive signal S2 to the drive unit 24 based on the operation signal S1 by the operation device 42 described above.

Figure 4:
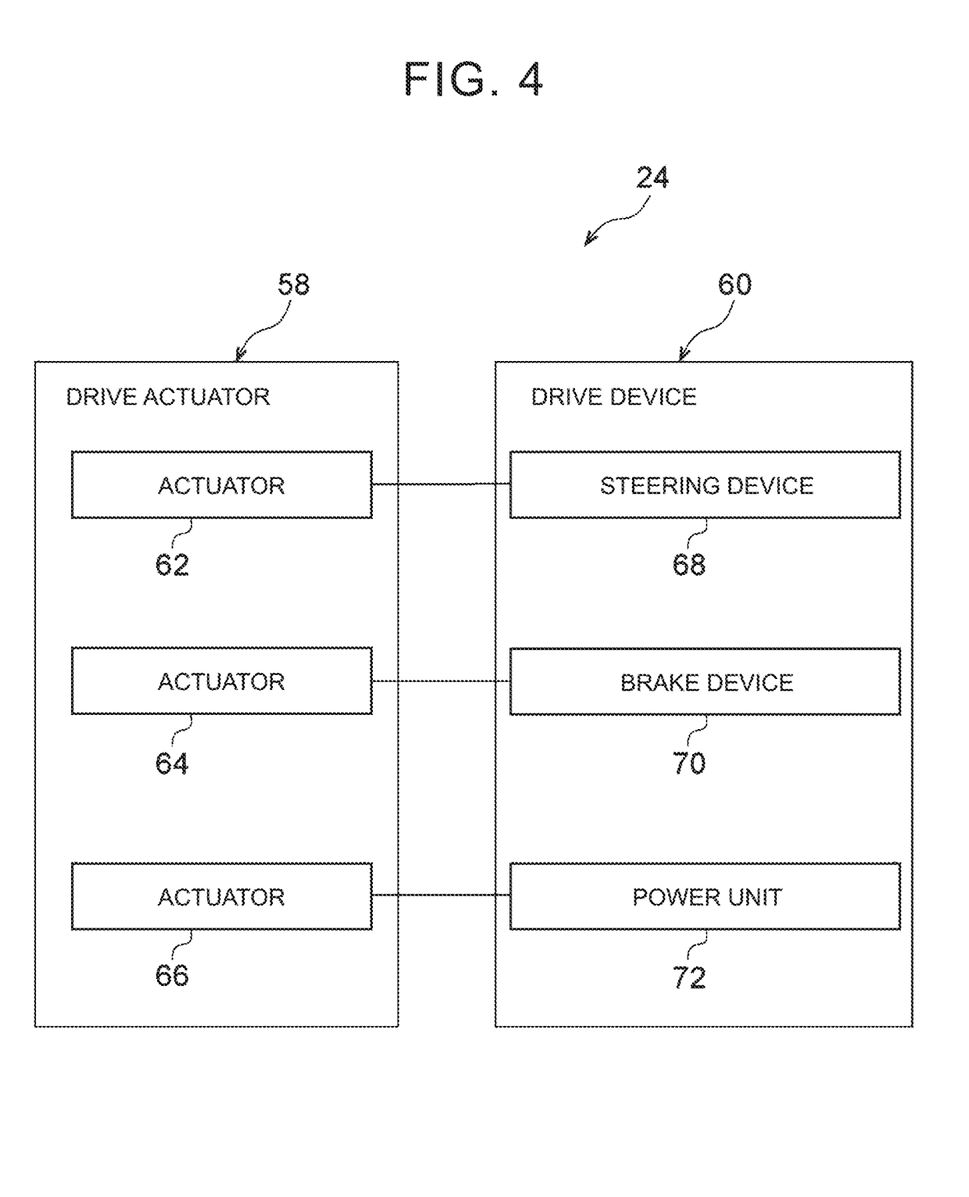
FIG. 4 is a block diagram showing a configuration of a drive unit in the vehicle control system according to the present embodiment.

With reference to FIG. 1 again, the drive unit 24 includes a drive actuator 58 and a drive device 60. As shown in FIG. 4, the drive actuator 58 includes a steering actuator 62, a brake actuator 64, and a power unit actuator 66. The drive device 60 includes a steering device 68, a brake device 70, and a power unit 72.

Specifically, the steering actuator 62 is configured to include a motor (not shown), drives the steering device 68 based on the drive signal S2, and reflects the operation of the steering wheel 46 by the driver in the steering angle of a steered wheel (not shown) in a normal state.

The brake actuator 64 is configured to include a motor (not shown), drives a brake caliper (not shown) of the brake device 70 based on the drive signal S2, and reflects the operation of the brake pedal 48 by the driver in braking of the vehicle 12 in a normal state.

The power unit actuator 66 is configured to include a motor (not shown), drives a throttle valve (not shown) of the power unit 72 and a drive motor for driving a drive wheel (not shown) based on the drive signal S2, and reflects the operation of the accelerator pedal 50 by the driver in driving of the vehicle 12 in a normal state.

As will be described later, the warning device 26 issues warning to the driver under predetermined conditions for a predetermined time per issuance. The warning device 26 may be installed in the vehicle 12 or may be a mobile terminal carried by the driver. Further, as the warning issued from the warning device 26, voice, text and lighting shown on the display unit, and the like can be adopted.

Next, the functional configuration of the vehicle control device 14 will be described with reference to FIG. 2. The vehicle control device 14 function as an aggregate of a "drive control unit 74", a safety device activation storage unit 76, a "model storage unit 78", a "risk level determination unit 80", a "risk frequency calculation unit 82", a "warning frequency setting unit 84", and a "traveling performance limiting unit 86" as the CPU 28 reads the execution program stored in the ROM 30 and executes the execution program.

The drive control unit 74 is capable of controlling the drive unit 24 by outputting the drive signal S2 based on the operation signal S1 to the drive unit 24 in a normal state. As will be described later, the drive signal S2 is adjusted in accordance with a risk level of the driving operation by the driver.

The safety device activation storage unit 76 is capable of storing the number of times that the safety device 20 is activated within a predetermined period based on the activation signal W1 output from the safety device 20.

The model storage unit 78 stores a standard driving model of the vehicle 12. As an example, the standard driving model is a learned neural network model in which a neural network model is learned by deep learning based on collected data related to various operation amounts in each scene when a normative driver drives a vehicle.

Then, the standard driving model is configured to output information (hereinafter referred to as a normative driving operation) indicating the driving operation by the normative driver when data representing a certain scene (for example, the radius of curvature of a road on which the vehicle 12 is traveling, the vehicle speed of the vehicle 12, and the distance to the preceding vehicle) is input. Note that, the normative driver herein means, for example, a good driver who has not committed a traffic violation within the past five years and whose average driving time is three hours or more per day. In addition, the number of normative drivers from whom data is collected may be singular or plural.

The risk level determination unit 80 compares the driving operation of the vehicle 12 by the driver based on the operation signal S1 input from the operation device 42 with the normative driving operation output from the standard driving model, and determines the risk level of the driving operation at intervals of predetermined time. The risk level referred herein is an index indicating the risk level of the driving operation by the driver, and is a value indicating the degree of deviation between the driving operation by the driver and the normative driving operation.

Specifically, when the radius of curvature of the road on which the vehicle 12 is traveling acquired by the external sensor 16, the vehicle speed of the vehicle 12 acquired by the internal sensor 18, and the like are input to the standard driving model, the normative driving operation when the vehicle is traveling on a curve is output from the standard driving model. Then, the risk level determination unit 80 determines the curve traveling risk level in accordance with the degree of deviation of the driving operation by the driver from the normative driving operation.

Further, the risk level determination unit 80 compares the speed of the vehicle 12 with the legal speed stored in a navigation device (not shown) or the like, and determines a driving speed risk level depending on the degree of deviation between the speed of the vehicle 12 and the legal speed.

Further, the risk level determination unit 80 determines a reverse driving risk level in accordance with the number of times that the driving operation by the driver deviates from the normative driving operation output from the standard driving model when the vehicle 12 is traveling in reverse.

Specifically, during reverse traveling of the vehicle 12, when the road on which the vehicle 12 is traveling and the situation around the vehicle 12 acquired by the external sensor 16 or the like are input to the standard driving model, the normative driving operation for reverse traveling is output from the standard driving model. Then, the risk level determination unit 80 measures the number of times that the driving operation by the driver deviates from the normative driving operation within a predetermined time when the vehicle 12 is traveling in reverse, and determines the reverse driving risk level based on the number of times.

Further, the risk level determination unit 80 determines the risk level of the driving operation based on the number of activations of the safety device 20 stored in the safety device activation storage unit 76. Further, the risk level determination unit 80 determines whether there is a traffic violation, that is, the degree of legal compliance, based on the data acquired by the external sensor 16 and the driving operation of the vehicle 12 by the driver based on the operation signal S1, and also determines a legal ignorance risk level based on the degree of legal compliance.

The risk frequency calculation unit 82 counts the number of times that the risk level determination unit 80 determines that the risk level of the driving operation by the driver is equal to or higher than a predetermined risk level, that is, the number of times of risky driving by the driver, within a predetermined period, and stores the number of times.

The warning frequency setting unit 84 sets the frequency of warning by the warning device 26 in accordance with the number of times of risky driving counted by the risk frequency calculation unit 82, and can activate the warning device 26.

Specifically, the warning frequency setting unit 84 compares the number of times of risky driving counted by the risk frequency calculation unit 82 in a period P1 as a first period and the number of times counted in a period P2 as a second period that is a period later than the period P1. Then, the warning frequency setting unit 84 increases the frequency of warning when the number of times of risky driving tends to increase.

As an example, in the initial setting, when the risk frequency calculation unit 82 counts five as the number of times of risky driving, the warning frequency setting unit 84 outputs an activation signal W2 to the warning device 26 and causes the warning device 26 to output warning once. Then, each time the number of times of risky driving counted in the period P2 exceeds the number of times of risky driving counted in the period P1, the number of times of risky driving that triggers the warning frequency setting unit 84 to output the activation signal W2 is decremented by one. Note that, in the state where the number of times of risky driving required for the warning frequency setting unit 84 to output the activation signal W2 is set to one, the frequency of warning becomes constant even though the number of times tends to increase.

On the other hand, when the number of times of risky driving tends to decrease, the warning frequency setting unit 84 reduces the frequency of warning.

As an example, in the present embodiment, each time the number of times of risky driving counted in the period P2 falls below the number of times of risky driving counted in the period P1, the number of times of risky driving that triggers the warning frequency setting unit 84 to output the activation signal W2 is incremented by one. Note that, in the state where the number of times of risky driving required for the warning frequency setting unit 84 to output the activation signal W2 is set to the default number (five in the present embodiment), the frequency of warning becomes constant even though the number of times tends to decrease.

The traveling performance limiting unit 86 is capable of limiting the traveling performance of the vehicle 12 by adjusting the drive signal S2 output to the drive unit 24 when the number of times of risky driving by the driver tends to increase excessively.

Specifically, the traveling performance limiting unit 86 compares the number of times of risky driving counted by the risk frequency calculation unit 82 in the period P2 with the number of times counted by the risk frequency calculation unit 82 in the period P1. Further, when the number of times of risky driving counted in the period P2 exceeds the number of times of risky driving counted in the period P1, the traveling performance limiting unit 86 compares the number of times counted in the period P2 and the number of times counted in a period P3 as a third period that is a period later than the period P2.

Then, in the present embodiment, as an example, the traveling performance limiting unit 86 is capable of setting the speed limit of the vehicle 12 by inputting the adjusted drive signal S2 to the drive unit 24 when the number of times of risky driving counted in the period P3 exceeds the number of times of risky driving counted in the period P2.

Note that, in the present embodiment, the drive unit 24 is controlled by the traveling performance limiting unit 86 such that the power unit 72 is driven in accordance with the depression amount of the accelerator pedal 50 until the speed of the vehicle 12 reaches the speed limit.

On the other hand, when the speed of the vehicle 12 has reached the speed limit, the traveling performance limiting unit 86 controls the drive unit 24 to control the drive amount of the power unit 72 such that the speed of the vehicle 12 does not exceed the speed limit even when the depression amount of the accelerator pedal 50 increases.

When the number of times of risky driving counted in the period P3 does not exceed the number of times of risky driving counted in the period P2, the traveling performance limiting unit 86 determines whether the traveling performance of the vehicle 12 is limited. When the traveling performance of the vehicle 12 is limited, the limitation is canceled.

Operation and Effects of Embodiment

Next, the operations and effects of the present embodiment will be described.

Figure 2:
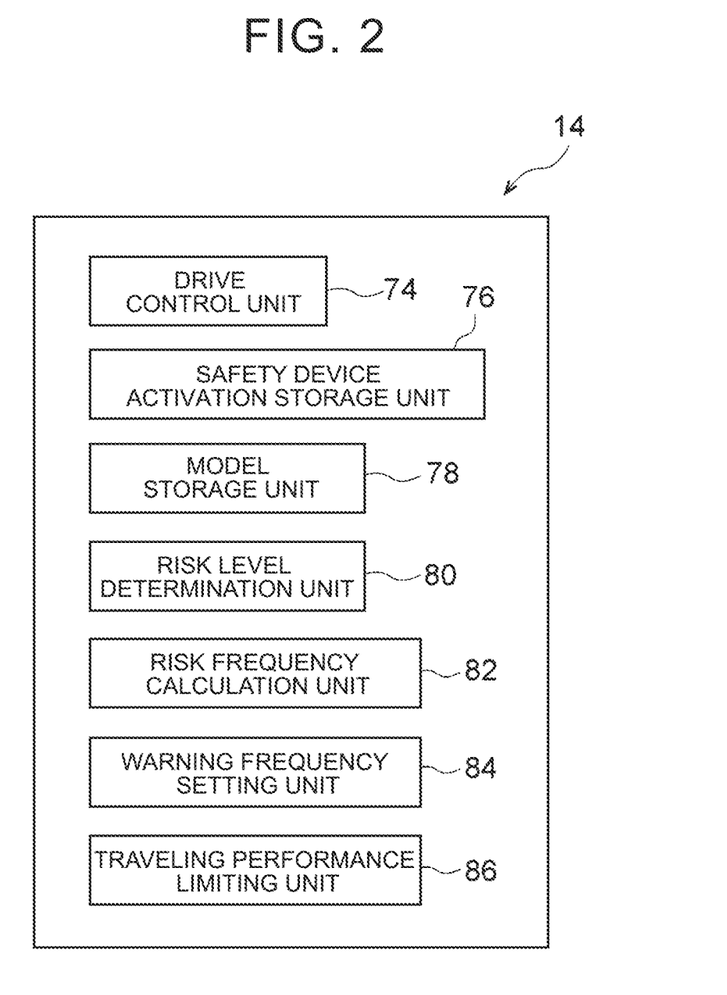
FIG. 2 is a functional block diagram showing a configuration of a vehicle control system according to the present embodiment.

In the present embodiment, as shown in FIGS. 1 and 2, when the driver performs the driving operation on the operation unit 22, the operation signal S1 based on the driving operation of the vehicle 12 by the driver is transmitted from the operation unit 22. The operation signal S1 is input to the risk level determination unit 80. The risk level determination unit 80 determines the risk level of the driving operation by comparing the driving operation by the driver with the standard driving model of the vehicle 12 stored in the model storage unit 78. Then, when the risk level determination unit 80 determines that the risk level of the driving operation by the driver is equal to or higher than the predetermined risk level, the warning device 26 issues warning to the driver.

When the driver tends to repeat risky driving, it is preferable that the driver be made aware that the driver is engaging in the risky driving.

Here, in the present embodiment, the risk frequency calculation unit 82 counts the number of times that the risk level determination unit 80 determines that the risk level is equal to or higher than the predetermined risk level within a predetermined period. Then, the warning frequency setting unit 84 sets the frequency of warning in accordance with the number of times, counted by the risk frequency calculation unit 82, that the risk level of the driving operation by the driver is determined to be equal to or higher than the predetermined risk level within the predetermined period, and activates the warning device 26.

Figure 5:
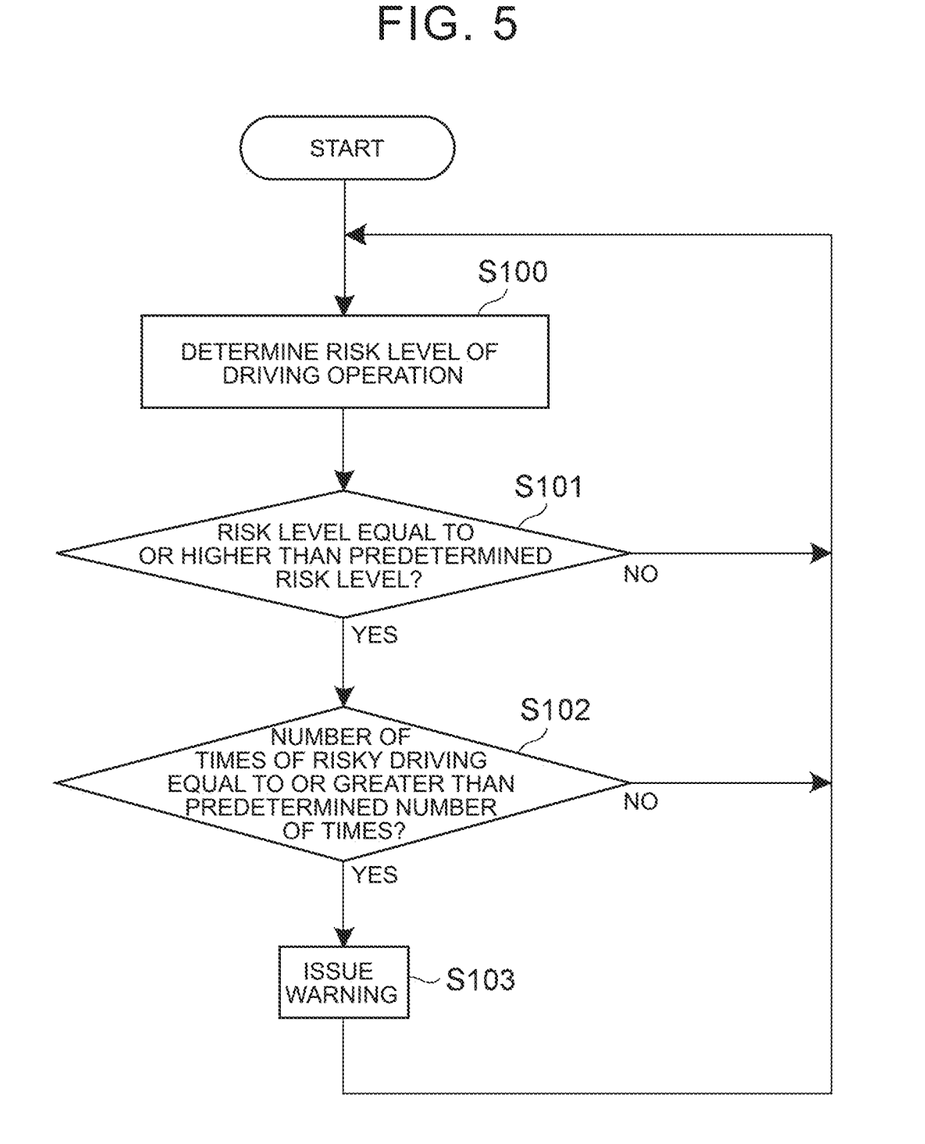
FIG. 5 is a flowchart showing a process when a notification unit is activated in the vehicle control system according to the present embodiment.

Hereinafter, a control flow executed by the vehicle control device 14 when the warning device 26 is activated will be described with reference to the flowchart shown in FIG. 5.

The control flow is started when the CPU 28 of the vehicle control device 14 receives a predetermined control signal at predetermined time intervals.

When the control flow is started, in step S100, the CPU 28 functions as the risk level determination unit 80, and determines the risk level of the driving operation by the driver. The process then proceeds to step S101.

In step S101, the CPU 28 functions as the risk level determination unit 80, and determines whether the risk level of the driving operation of the driver is equal to or higher than a predetermined risk level. Then, when the risk level of the driving operation by the driver is equal to or higher than the predetermined risk level (step S101: YES), the process proceeds to step S102. On the other hand, when the risk level of the driving operation by the driver has not reached the predetermined risk level (step S101: NO), the process returns to step S100.

In step S102, the CPU 28 functions as the risk frequency calculation unit 82 and the warning frequency setting unit 84, and counts the number of times that the risk level determination unit 80 determines that the risk level of the driving operation by the driver is equal to or higher than the predetermined risk level, that is, the number of times of risky driving by the driver, within a predetermined period. Then, when the number of times of risky driving is equal to or greater than the set predetermined number of times (step S102: YES), the process proceeds to step S103. When the number of times of risky driving is less than the predetermined number of times (step S101: NO), the process returns to step S100.

In step S103, the CPU 28 functions as the warning frequency setting unit 84 and activates the warning device 26. The process then returns to step S100.

As described above, in the present embodiment, when the driver tends to repeat risky driving, the number of warnings to the driver is increased such that the driver can be made aware that the driver is engaging in the risky driving. Therefore, in the present embodiment, it is possible to suppress the driver from engaging in the risky driving.

Further, in the present embodiment, the warning frequency setting unit 84 compares the number of times of risky driving counted by the risk frequency calculation unit 82 in the period P1 with the number of times counted in the period P2 that is a period later than the period P1. Then, when the number of times that the risk level of the driving operation is determined to be equal to or higher than the predetermined risk level tends to increase, the warning frequency setting unit 84 increases the frequency of warning issued by the warning device 26, and reduces the frequency of warning when the number of times tends to decrease.

Figure 6:
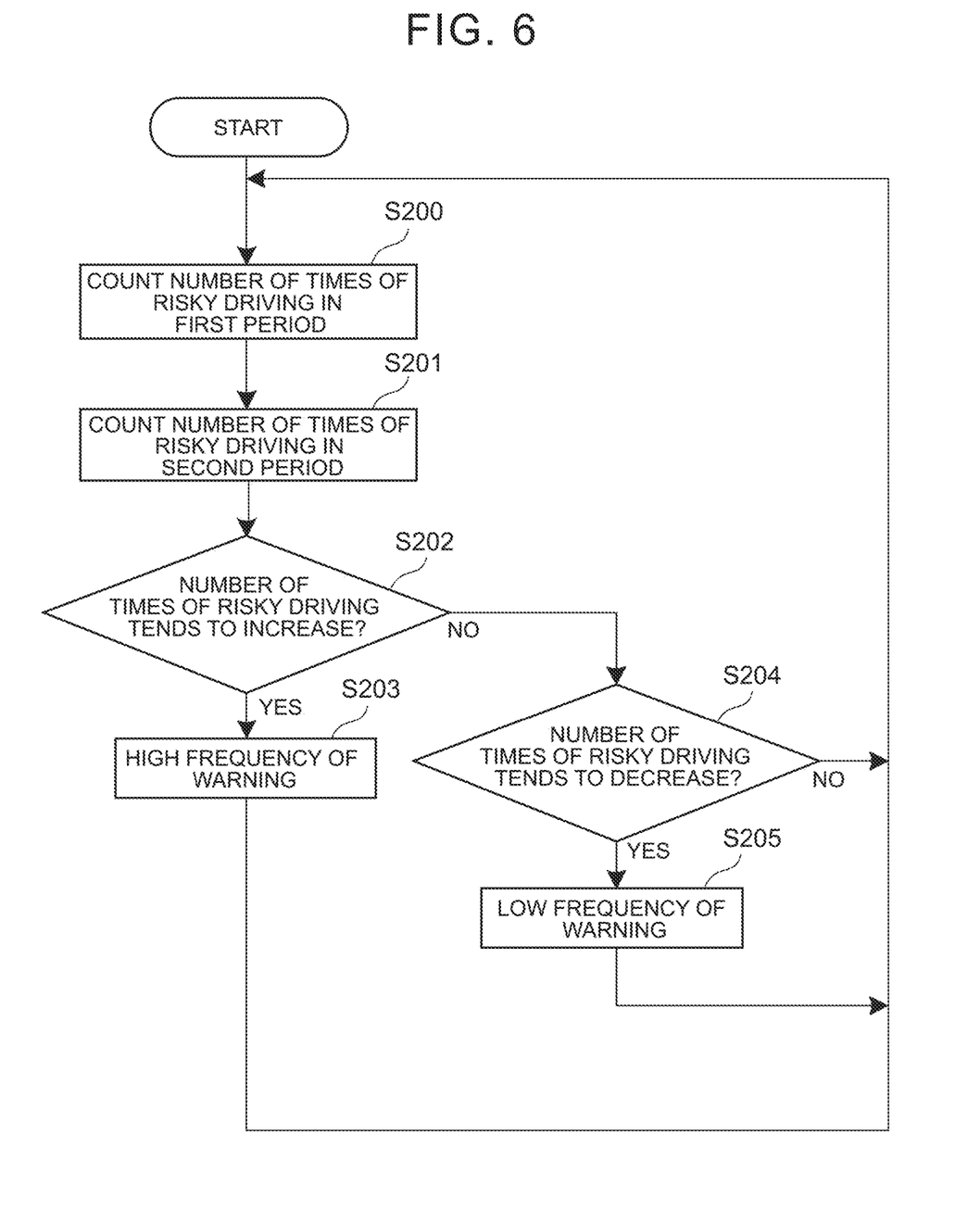
FIG. 6 is a flowchart showing a process for setting a frequency of warning in the vehicle control system according to the present embodiment.

Hereinafter, a control flow in which the vehicle control device 14 sets the frequency of warning will be described with reference to the flowchart shown in FIG. 6. The control flow is started when the CPU 28 of the vehicle control device 14 receives a predetermined control signal at predetermined time intervals.

When the control flow is started, in step S200, the CPU 28 functions as the risk frequency calculation unit 82, and counts the number of times of risky driving in the period P1. The process then proceeds to step S201.

In step S201, the CPU 28 functions as the risk frequency calculation unit 82, and counts the number of times of risky driving in the period P2. The process then proceeds to step S202.

In step S202, the CPU 28 functions as the warning frequency setting unit 84, and compares the number of times of risky driving counted in the period P1 with the number of times counted in the period P2. Then, when the number of times of risky driving counted in the period P2 increases with respect to the number of times counted in the period P1 (step S202: YES), the process proceeds to step S203. On the other hand, when the number of times of risky driving counted in the period P2 does not increase with respect to the number of times counted in the period P1 (step S202: NO), the process proceeds to step S204.

In step S203, the CPU 28 functions as the warning frequency setting unit 84 and increases the frequency of warning. The process then returns to step S200.

In step S204, the CPU 28 functions as the warning frequency setting unit 84, and compares the number of times of risky driving counted in the period P1 with the number of times counted in the period P2. Then, when the number of times of risky driving counted in the period P2 decreases with respect to the number of times counted in the period P1 (step S204: YES), the process proceeds to step S205. On the other hand, when the number of times of risky driving counted in the period P2 does not decrease with respect to the number of times counted in the period P1, that is, the number of times in the period P1 is the same as the number of times in the period P2 (step S204: NO), the process returns to step S200.

In step S205, the CPU 28 functions as the warning frequency setting unit 84, and reduces the frequency of warning. The process then returns to step S200.

As described above, in the present embodiment, the driver can understand whether the driving operation by the driver tends to improve or deteriorate from the viewpoint of safety due to a change in the frequency of warning. Therefore, in the present embodiment, it is possible to encourage the driver to perform safe driving operation.

Further, in the present embodiment, the traveling performance limiting unit 86 is provided as a function of the vehicle control device 14. The traveling performance limiting unit 86 compares the number of times of risky driving between the period P1 and the period P2. Further, when the number of times of risky driving counted in the period P2 exceeds the number of times of risky driving counted in the period P1, the traveling performance limiting unit 86 compares the number of times between the period P3 that is a period later than the period P2 and the period P2.

Then, when the number of times of risky driving counted in the period P3 exceeds the number of times counted in the period P2, the traveling performance limiting unit 86 limits the traveling performance of the vehicle 12.

Figure 7:
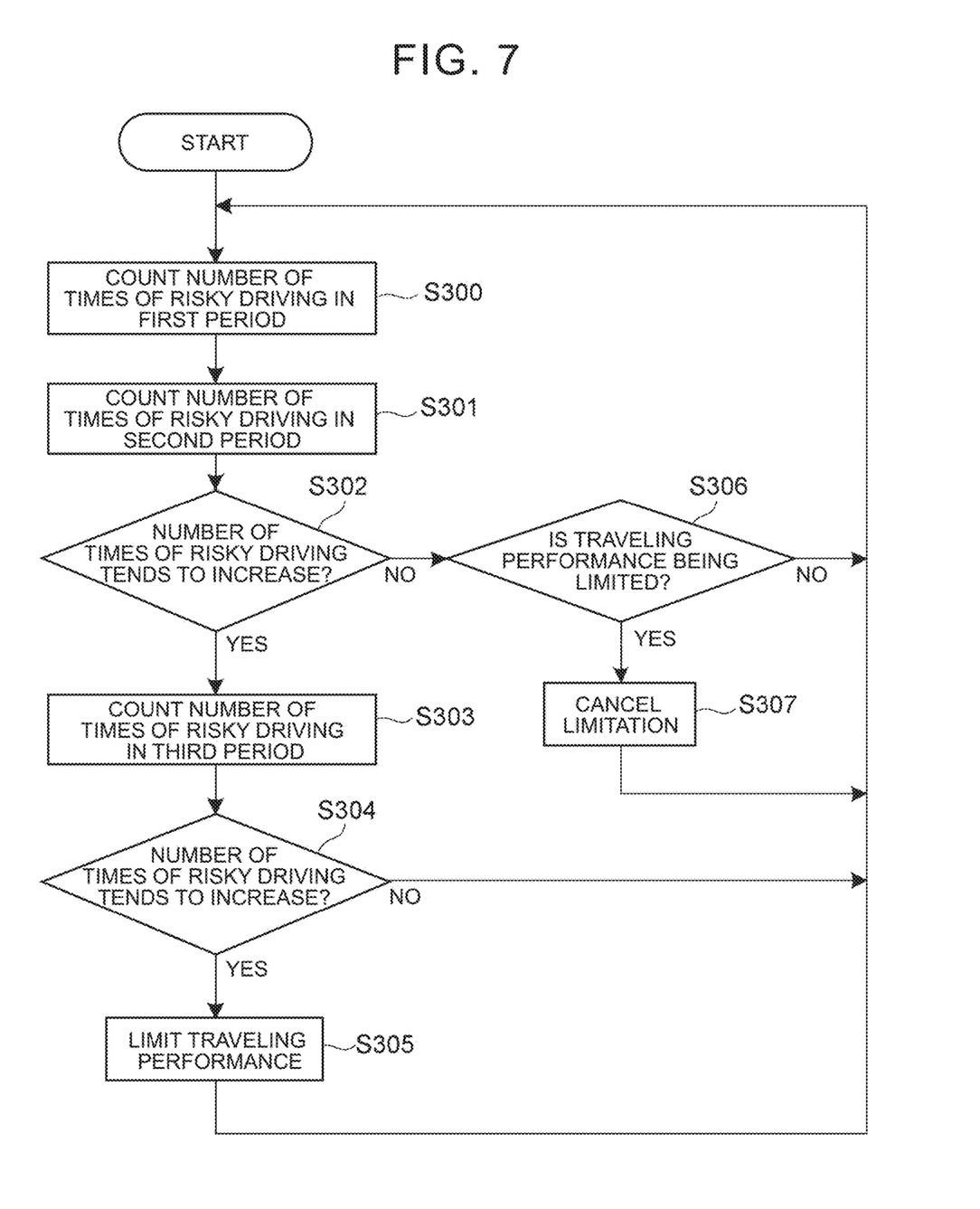
FIG. 7 is a flowchart showing a process when a traveling performance of the vehicle is limited in the vehicle control system according to the present embodiment.

Hereinafter, a control flow in which the vehicle control device 14 limits the traveling performance of the vehicle 12 will be described with reference to the flowchart shown in FIG. 7. This control flow is started when the CPU 28 of the vehicle control device 14 receives a predetermined control signal at predetermined time intervals.

When the control flow is started, in step S300, the CPU 28 functions as the risk frequency calculation unit 82, and counts the number of times of risky driving in the period P1. The process then proceeds to step S301.

In step S301, the CPU 28 functions as the risk frequency calculation unit 82, and counts the number of times of risky driving in the period P2. The process then proceeds to step S302.

In step S302, the CPU 28 functions as the traveling performance limiting unit 86, and compares the number of times of risky driving counted in the period P1 with the number of times counted in the period P2. Then, when the number of times of risky driving counted in the period P2 increases with respect to the number of times counted in the period P1 (step S302: YES), the process proceeds to step S303. On the other hand, when the number of times of risky driving counted in the period P2 does not increase with respect to the number of times counted in the period P1 (step S302: NO), the process proceeds to step S306.

In step S303, the CPU 28 functions as the risk frequency calculation unit 82, and counts the number of times of risky driving in the period P3. The process then proceeds to step S304.

In step S304, the CPU 28 functions as the traveling performance limiting unit 86, and compares the number of times of risky driving counted in the period P2 with the number of times counted in the period P3. Then, when the number of times of risky driving counted in the period P3 increases with respect to the number of times counted in the period P2 (step S304: YES), the process proceeds to step S305. On the other hand, when the number of times of risky driving counted in the period P3 does not increase with respect to the number of times counted in the period P2 (step S304: NO), the process proceeds to step S300.

In step S305, the CPU 28 functions as the traveling performance limiting unit 86, and limits the traveling performance of the vehicle 12. The process then returns to step S300.

On the other hand, in step S306, the CPU 28 functions as the traveling performance limiting unit 86, and determines whether the traveling performance of the vehicle 12 is limited. Then, when the CPU 28 determines that the traveling performance of the vehicle 12 is limited (step S306: YES), the process proceeds to step S307. On the other hand, when the CPU 28 determines that the traveling performance of the vehicle 12 is not limited (step S306: NO), the process returns to step S300.

In step S307, the CPU 28 functions as the traveling performance limiting unit 86, and cancels limitation of the traveling performance of the vehicle 12. The process then returns to step S300.

As described above, in the present embodiment, when the driving operation by the driver does not exhibit the tendency of improvement from the viewpoint of safety, it is possible to limit that the driving operation by the driver is directly reflected in traveling of the vehicle 12.

Supplementary Explanation of Above Embodiment (1) According to the above-described embodiment, the learned neural network model in which the neural network model is learned by deep learning is adopted as the standard driving model. However, the present disclosure is not limited to this. For example, a standard operation table in which information on each scene when the vehicle is traveling (for example, the radius of curvature of the road on which the vehicle is traveling and the vehicle speed of the vehicle) and the driving operations of the normative driver in each scene are associated may be adopted as the standard driving model, depending on the specifications of the vehicle 12 and the like.

(2) Further, in the above-described embodiment, the speed of the vehicle 12 is limited by the traveling performance limiting unit 86. However, the present disclosure is not limited to this. For example, a configuration in which the steering of the vehicle 12 or the like is limited by the traveling performance limiting unit 86 in accordance with the specifications of the vehicle 12 and the like can be adopted.

(3) Further, in the above-described embodiment, the traveling performance of the vehicle 12 can be limited by the traveling performance limiting unit 86. However, the present disclosure is not limited to this. For example, the traveling performance limiting unit 86 may be omitted from the functions of the vehicle control device 14 by adopting a configuration in which the drive device 60 can be directly operated by the operation device 42 in accordance with the specifications of the vehicle 12 and the like.

What is claimed is:

1. A vehicle control system, comprising:
an operation unit that is configured to output an operation signal based on a driving operation of a vehicle by a driver;
a model storage unit that stores a standard driving model of the vehicle;
a risk level determination unit that is configured to
receive the operation signal, and
compare the driving operation with the standard driving model and determine a risk level of the driving operation;
a notification unit that is configured to issue a warning to the driver in response to the risk level being determined to be equal to or higher than a predetermined risk level;
a risk frequency calculation unit that is configured to count the number of times that the risk level of the driving operation is determined to be equal to or higher than the predetermined risk level within a predetermined period; and
a warning frequency setting unit that is configured to
set a frequency of the warning in accordance with the number of times that the risk level of the driving operation is determined to be equal to or higher than the predetermined risk level within the predetermined period, and
activate the notification unit,
wherein
the predetermined period is a first period,
the warning frequency setting unit is configured to
compare (i) the number of times counted by the risk frequency calculation unit that the risk level is determined to be equal to or higher than the predetermined risk level within the first period with (ii) the number of times counted by the risk frequency calculation unit that the risk level is determined to be equal to or higher than the predetermined risk level within a second period later than the first period,
increase the frequency of the warning in response to determining that the number of times counted within the second period exceeds the number of times counted in the first period, and
reduce the frequency of the warning in response to determining that the number of times counted within the second period fails to exceed the number of times counted in the first period,
the vehicle control system further comprises a traveling performance limiting unit, and
the traveling performance limiting unit is configured to:
compare the number of times counted in the first period with the number of times counted in the second period;
in response to determining that the number of times counted in the second period exceeds the number of times counted in the first period, compare the number of times counted in the second period with the number of times counted in a third period, the third period being later than the second period; and limit a traveling performance of the vehicle in response to determining that the number of times counted in the third period exceeds the number of times counted in the second period.

2. The vehicle control system according to claim 1, wherein
the risk level determination unit is configured to determine the risk level of the driving operation by determining a driving speed risk level depending on a degree of deviation between a speed of the vehicle and a legal speed.

3. The vehicle control system according to claim 1, wherein
the risk level determination unit is further configured to
measure the number of times that the driving operation of the vehicle deviates from the standard driving model within a further predetermined time period when the vehicle is traveling in reverse, and
determine the risk level of the driving operation by determining a reverse driving risk level based on the number of times that the driving operation of the vehicle deviates from the standard driving model within the further predetermined time period when the vehicle is traveling in reverse.

4. The vehicle control system according to claim 1, further comprising:
a safety device configured to be activated for ensuring a safety performance of the vehicle, wherein
the risk level determination unit is configured to determine the risk level of the driving operation based on the number of activations of the safety device.

* * * * *